United States Patent
Eisenstadt et al.

(10) Patent No.: US 7,801,950 B2
(45) Date of Patent: Sep. 21, 2010

(54) SYSTEM FOR ANALYZING AND VISUALIZING ACCESS STATISTICS FOR A WEB SITE

(75) Inventors: Marc Eisenstadt, Milton Keynes (GB); Jiri Komzak, Hloubetin (CZ)

(73) Assignee: Clustrmaps Ltd., Milton Keynes (GB)

(*) Notice: Subject to any disclaimer, the term of this patent is extended or adjusted under 35 U.S.C. 154(b) by 491 days.

(21) Appl. No.: 11/757,244

(22) Filed: Jun. 1, 2007

(65) Prior Publication Data
US 2009/0077221 A1    Mar. 19, 2009

(51) Int. Cl.
G06F 15/16    (2006.01)
G06F 15/177    (2006.01)
G06F 15/173    (2006.01)

(52) U.S. Cl. .................. 709/203; 709/220; 709/224; 707/E17.11

(58) Field of Classification Search .............. None
See application file for complete search history.

(56) References Cited

U.S. PATENT DOCUMENTS

| | | | |
|---|---|---|---|
| 6,104,410 A * | 8/2000 | Wong | 345/440 |
| 6,792,458 B1 | 9/2004 | Muret et al. | |
| 6,804,701 B2 | 10/2004 | Muret et al. | |
| 7,039,689 B2 | 5/2006 | Martija et al. | |
| 2007/0233864 A1* | 10/2007 | Xie et al. | 709/226 |
| 2008/0244046 A1* | 10/2008 | Campbell et al. | 709/222 |

OTHER PUBLICATIONS

IP2map, "IP2MAP.COM", Dec. 23, 2005.*
Frappr, www.frappr.com, Oct. 9, 2007.
MapLoco, www.maploco.com, Oct. 9, 2007.
IPLigence, www.ipligence.com, Oct. 9, 2007.
IP2Map, www.ip2map.com, Oct. 9, 2007.
FreeHitMaps, www.freehitsmap, Oct. 9, 2007.
NewWorldVisitorMap, www.newworldvisitormap.com, Oct. 9, 2007.
Geoloc, www.geo-loc.com, Oct. 9, 2007.
Geovisite, www.geovisite.com, Oct. 9, 2007.
BlogFlux MapStats, www.blogflux.com, Oct. 9, 2007.
Gvisit, www.gvisit.com, Oct. 9, 2007.
GlobeTrackr, www.globetrackr.com, Oct. 9, 2007.
Google Analytics, www.google.com/analytics, Oct. 9, 2007.
SiteMeter, www.sitemeter.com, Oct. 9, 2007.
NeoWorx NeoEarth, www.neoworx.com, Oct. 9, 2007.
StatCounter, www.statcounter.com, Oct. 9, 2007.
VisitorMap for iGoogle, visitormap.googlecode.com, Oct. 9, 2007.

* cited by examiner

*Primary Examiner*—Wen-Tai Lin
(74) *Attorney, Agent, or Firm*—Knobbe, Martens, Olson & Bear, LLP

(57) ABSTRACT

A method for monitoring and visualizing user access made to a web site is disclosed. The method comprises: embedding in a web page to be monitored code to request a thumbnail image from a site when the page is loaded into a browser. The embedded code also includes a user-activateable link to a page within the system server. At the system server, the requested thumbnail image is returned to the web browser, and the IP address from which the thumbnail was requested is recorded. For each recorded IP address, the server determines a corresponding geographical location. The server creates and stores an image that is a geographical representation of the geographical distribution of the recorded IP addresses, and a thumbnail representation of that image. Upon activation of the user-activateable link, the linked page within the system server that includes the image previously created is retrieved by the browser. The thumbnail image requested by the embedded code is the thumbnail image created in this step. A number of threshold, updating, clustering, storage and archiving routines are deployed to ensure large scalability.

22 Claims, 5 Drawing Sheets

SYSTEM FOR ANALYZING AND VISUALIZING ACCESS STATISTICS FOR A WEB SITE

BACKGROUND OF THE INVENTION

1. Field of the Invention

This invention relates to a system for analyzing and visualizing access statistics for a web site.

2. Description of the Related Art

Many webmasters value the ability to obtain a detailed understanding of the number and location of those accessing their web sites. This information can be an essential tool in the quest to secure advertising revenue and to understand how better to make a site attractive to users in different locations (e.g. different language versions). Therefore, a range of hit counters and web analysis tools are available. These tools provide systems for counting the number of visitors to a web site, and for analyzing the log files kept by a server.

U.S. Pat. No. 6,804,701 and U.S. Pat. No. 6,792,458 disclose a system and method for monitoring and analyzing Internet traffic. The disclosed system and method processes data by reading log files produced by web servers, or by interfacing with the web server in real time, processing the data as it occurs.

U.S. Pat. No. 7,039,689 discloses a method and system for determining geographical regions of hosts in a network by preselecting sample hosts in the network, the geographical location of the preselected servers being determined.

However, existing systems suffer from several problems that limit their usefulness. They provide only numerical output with no visualization capability or provide visualization that is limited in scale. Alternatively, they may provide large-scale visualization but require advanced technical knowledge to run. Also, they do not provide a compact in situ representation of the results that is instantly visible on the very site they are analyzing.

SUMMARY OF THE INVENTION

An aim of certain embodiments of this invention is to provide an improved system for analyzing and visualizing access statistics for a web server that is technically simple to install and can be executed on any web page that it is analyzing in a highly scalable manner. Further, it is an aim of one or more embodiments of the invention to provide a system for analyzing access statistics that produces a readily understandable graphical output.

A further aim of an embodiment of the invention is to provide a system and a method that enables an "in-situ visualization" (that is, the result is displayed on the site it is analyzing) of visitors to a web site; in a manner that a) is technically simple to install; b) operates at a very large scale, so that for example millions of visitors can be displayed; c) relies on three different methods to achieve scalability: a threshold test for updating maps (which only updates when there is greater than a threshold number of new visits), a variable update frequency (e.g. daily, weekly or monthly), and a variable archive frequency for storing old maps and starting afresh; and d) uses an instrument to trigger the count that is itself a faithful depiction of the visualization (the in-situ map).

Informally, one embodiment of the invention provides a geographic hit-counter; that is to say, a counter that counts visits to a web page and displays them in geographic maps. It displays a counter—a thumbnail map—directly in a user's web page. The thumbnail map is, at the same time, used to count visits.

From a first aspect, an embodiment of this invention provides a method for monitoring user visits to a web site comprising: a. embedding in a web page to be monitored code to request a thumbnail image from a system server when the page is loaded into a browser and a user-activateable link to a page within the system server; b. at the system server, returning the requested thumbnail image to the web browser, and recording the IP address from which the thumbnail was requested; c. for each recorded IP address, determining a corresponding geographical location; d. creating and storing an image that is a geographical representation of the geographical distribution of the recorded IP addresses, and a thumbnail representation of that image; and e. wherein, upon activation of the user-activateable link, the linked page within the system server that includes the image created in step d. is retrieved by the browser, and the thumbnail image requested in step a. is the thumbnail image created in step d.

The thumbnail is fetched and displayed every time a web page is rendered in a browser without any action on the part of a user. Therefore, it is possible to count the number of times a page has been requested (that is, the number of page views) by counting the number of times the thumbnail image is delivered from the server. The IP address from which the request for the thumbnail originates provides, via an intermediate lookup table in a database, an indication of the location from which the request was made.

The geographical representation typically includes a map upon which marks are superimposed to indicate the location of an access made to the web site. The size of the marks may be varied as an indication of the number of accesses made from the geographical location. The marks may be appropriately circular. The number of visits represented by each mark may be varied in dependence on the total number of visits to be represented. This ensures that the marks are of an appropriate size in relation to the size of the map as a whole.

The visits may be grouped so that each mark represents a group of visits. The grouping may be performed by a process of agglomerative hierarchical clustering. During grouping, all visits are preferably pre-grouped into clusters that are similar in some way. For example, pre-grouping may be performed for map locations. We can do this by rounding off their co-ordinates or with a common post-code. Additionally, the number of visits in each cluster may be reduced by a common factor.

At step d, a plurality of images may be created. These may be different representations of the geographical distribution of the recorded IP addresses. The images may be representations of the geographical distribution of the recorded IP addresses at different scales. The images may be representations of geographically defined subsets of the geographical distribution of the recorded IP addresses at different scales (for example, data relating to a continent, country or region or IP-address range). In the latter case, the scale of the image may be increased when the representation is of a smaller geographical area.

Each visit is typically recorded in a current database. Each visit may be recorded as it occurs. Alternatively, data representing visits may be derived from data recorded in the logs of the system server. In such embodiments, the image generated in step d. will typically represent information in the current database.

Information in the current database may be periodically copied to an archive. Archived information can be removed from the current database following its being copied to the archive. This ensures that the content of the current database (and therefore the time taken to process it) does not increase indefinitely. Likewise, prior to step d., an image generated in a previous invocation of step d. may be copied to an archive. This allows a history of the visits to be maintained.

The image may be generated in step d. periodically or in response to one or more triggers. The triggers include one or more of elapse of a predetermined time; a change threshold in the number of recorded visits is exceeded, and immediately before a map is archived.

From a second aspect, an embodiment of the invention provides a system server for co-operation with a web browser to perform a method according to any preceding statement of invention.

BRIEF DESCRIPTION OF THE DRAWINGS

An embodiment of the invention will now be described in detail, by way of example, and with reference to the accompanying drawings, in which.

DETAILED DESCRIPTION OF THE PREFERRED EMBODIMENTS

A system embodying one embodiment of the invention is implemented as a module that operates on a server (which will be referred to as the "system server") that is connected to the Internet. Most typically, this module is a plug-in component for a web server.

Figure 1:
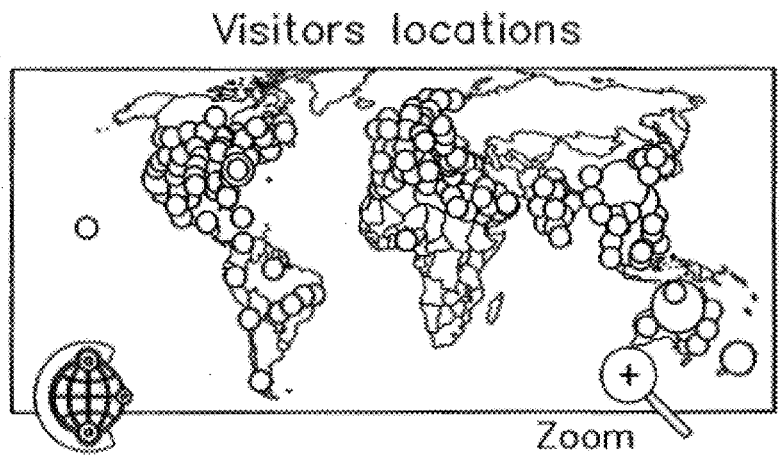
FIG. 1 shows typical thumbnail map produced by an embodiment of the invention.
Figure 2:
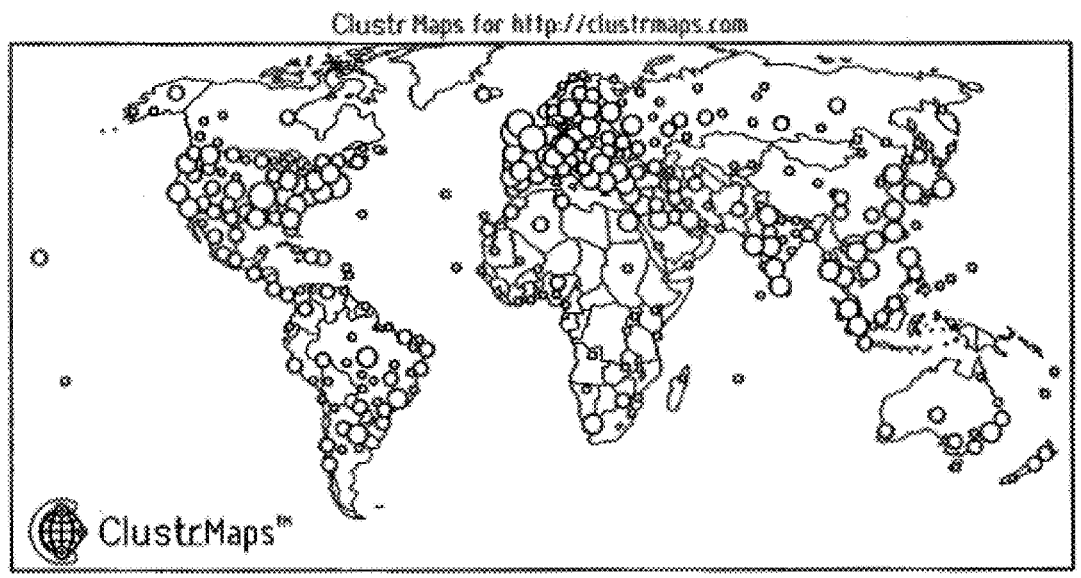
FIG. 2 shows a more detailed map produced by an embodiment of the invention.
Figure 3:
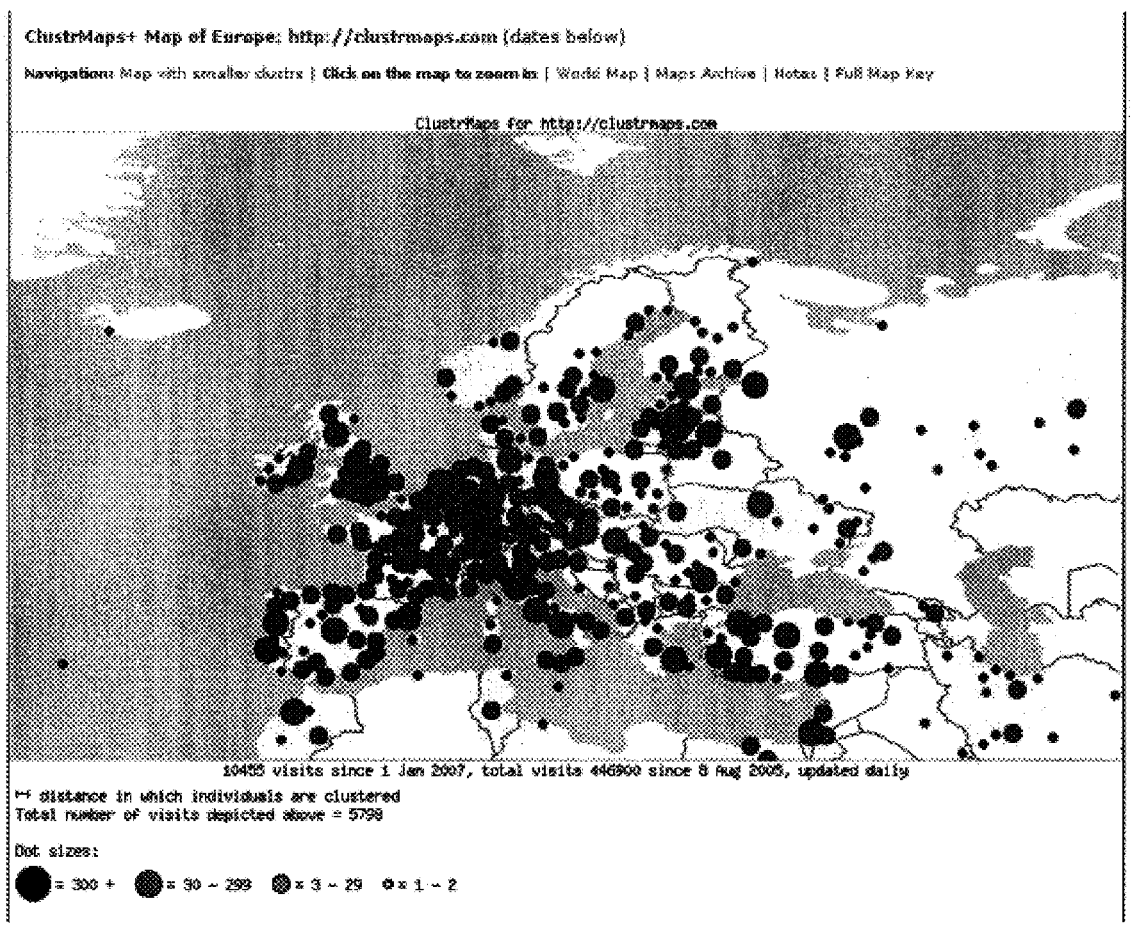
FIG. 3 shows a regional map produced by an embodiment of the invention.
Figure 4:
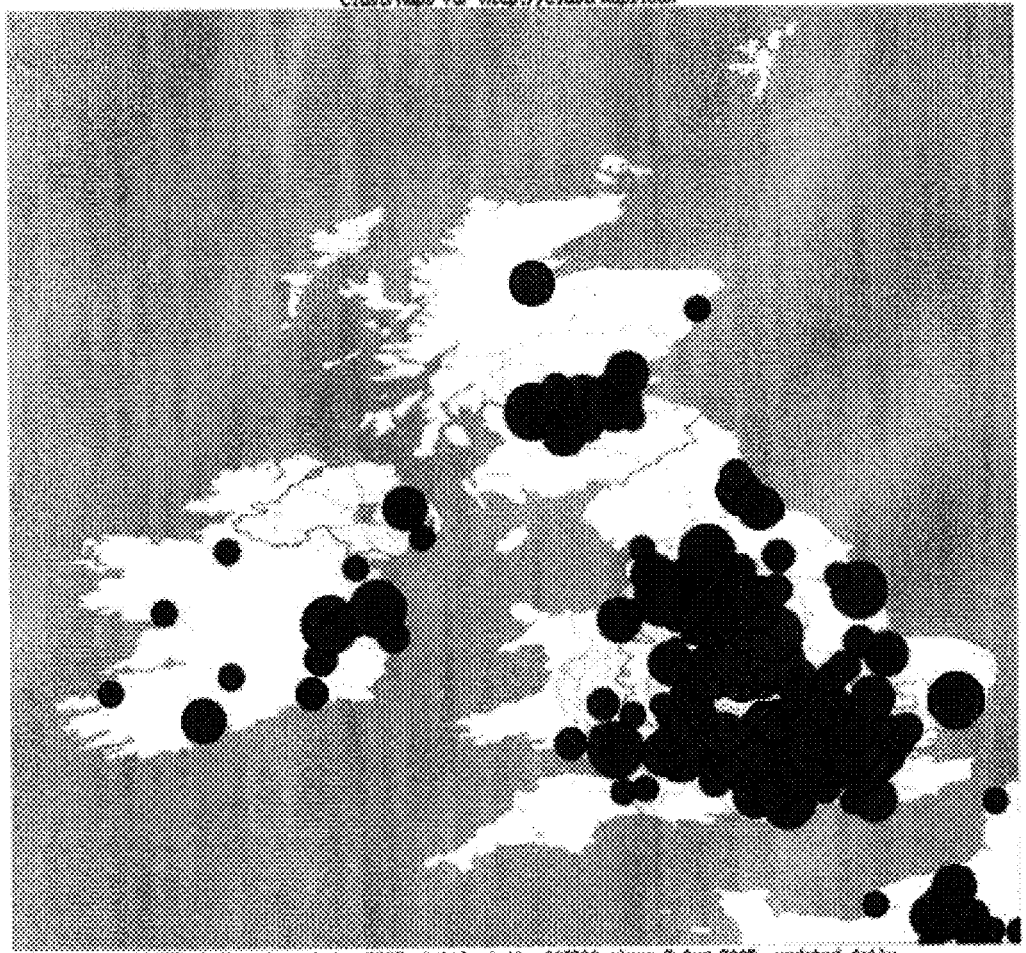
FIG. 4 shows a national map produced by an embodiment of the invention.
Figure 4:

From the user's point of view the counter consists of a thumbnail-sized map, as shown in FIG. 1, that is displayed as a component of a web page. A user can click on the thumbnail-sized map to display a more-detailed map, as shown in FIG. 2. The user can then click on the more-detailed map to obtain a regional map, as shown in FIG. 3. In some regions, the regional map may itself be clickable to obtain a national map, an example being shown in FIG. 4.

FIG. 1 shows a typical example of the small thumbnail map that represents just over 41,000 visits to a website. This is displayed as a small image on a web page. That is, it is displayed within the context of the web site that is being monitored.

After clicking on the thumbnail map in the web page, the user is taken to a special page, as shown in FIG. 2, with more detailed maps, typically starting with a world map, for a more detailed display of current visits. This page is not part of the site that is being monitored; it is generated by a server that is responsible for operating the visit-counting system. From there he or she can browse the maps, zooming in and out, changing clustering level or exploring archived maps and their differences.

The system server also provides a user administration page that allows users whose web sites are being monitored to administer their accounts. At first, each user needs to sign up to the system to get an account and access to their own settings. After a user logs into the account for administration for the first time he or she can copy a small piece of HTML code that is customized for the particular account. This piece of code is then inserted into the web page that is to be monitored. This HTML code displays the thumbnail and has links to other map pages. The administration page also allows further settings of the account such as update and archive frequencies, to be configured. These settings will be discussed below.

Figure 5:
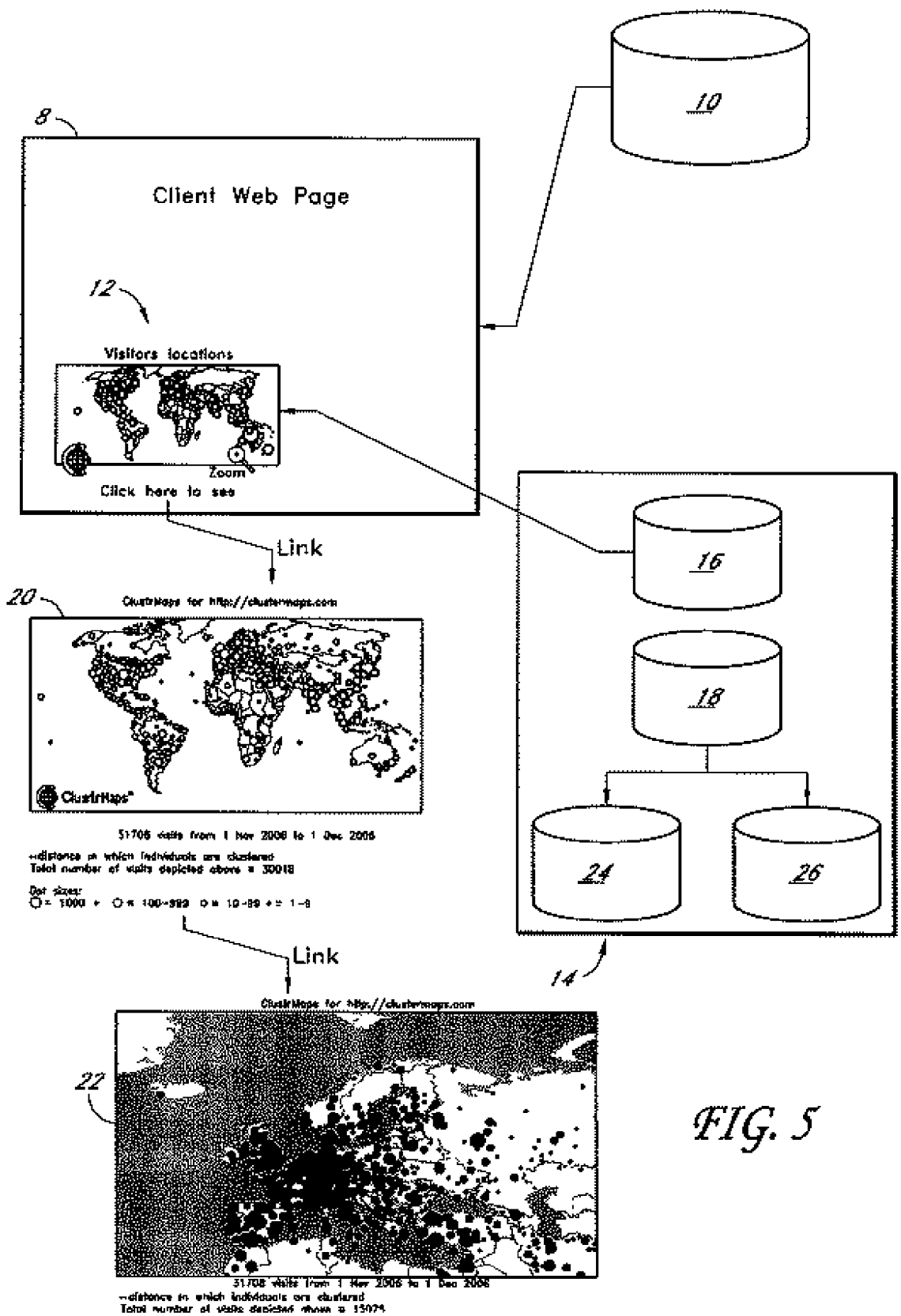
FIG. 5 illustrates a database schema used in an embodiment of the invention.

The procedure to be followed by a web site administrator to implement visit counting on his or her web site will now be discussed, with reference to FIG. 5.

Having logged in to the administration page for their account, a user copies some HTML from the administration page and inserts this code into the code for the web page 8 (including a template or "blog gutter" as appropriate) that is to be monitored. The modified code is then uploaded to the user's web server 10 (including that of the user's web service or hosting provider, as appropriate). The HTML includes a link to a thumbnail map image 12 generated by a map generation component 16 of the system server 14.

When the thumbnail map image 12 is served from the system server 14 to the user's site illustrated at 8, the server increments a counter and records in a current database 18 the IP address of the machine viewing that image, either immediately or, for large scale processing, in overnight runs using analysis of log files in which that IP address has already been stored. The visitor's IP address is provided by default to all web browsers: the system does not need any special measures to receive this data. Visitors to a site don't need to click on anything to record their visit: simply viewing a web page containing the thumbnail map is sufficient.

Users can click on the thumbnail 12 to see a larger world map display 20, and (optionally, depending on the range of services to which the web site owner has subscribed) also zoom in on the different continents and some countries to receive further map pages 22.

The IP address is converted to the nearest city location using an IP address to location database. This can identify the geographical location of the visitor reasonably accurately. Typically, it provides city-level or town-level accuracy and is reasonably up-to-date, the database being updated every three months at most.

The visits are represented on a map as dots, the size of which represent the number of visits from a particular location. The system uses a high-speed clustering algorithm to collapse small dots into larger ones, in one of two ways: (i) it clusters all dots within a given IP address; (ii) it clusters all dots within a given geographical radius, depending on the map size.

Visits are counted using a method according to Algorithm 1, presented below. A visit is recorded each time a thumbnail map is served. The visits are stored as a number for each [User ID, visiting IP] pair. They can be counted live into a current database 18 or obtained afterwards from web server log-file analysis (in 'batch mode').

The clustering operation can optionally be accelerated by application of a scaling approximation technique. In this technique, there is defined a 'scale factor' S. Every element of the logged-visits database is reduced by the factor S, which provides us with a large speedup with an acceptable approximation of the true totals. The algorithm to do this is as follows:

```
FOR EACH tuple ([IPA, UID, TALLY]) described in Algorithm 1b,
TALLY := INT(TALLY/S)+1    // rounded up to ensure
                            // it is never 0
```

The above scaling approximation can introduce inaccuracies, however, so we have developed a specialized algorithm for maps showing very large numbers of visits (e.g. millions of dots), that has the advantage of making the maps look much better by normalizing the dot sizes, while maintaining accuracy. This is described in Algorithm 6, below.

Generation of maps is described in Algorithms 3 and 4, below.

In this embodiment, maps are generated once a day; that is, maps are served as static image files. Generation of maps may be triggered by the occurrence of several different events. For example, maps may be generated after a predetermined time has elapsed since the maps were last updated, a change threshold in the number of recorded visits is exceeded, or immediately before a map is archived.

All maps (thumbnails as well as detailed maps) are not generated on-the-fly but rather pre-generated at predetermined intervals and stored. Although the map generation process is typically run once a day, whether any particular map will be updated (re-generated) depends on two things: (1) the map update frequency and (2) the proportional increase in the number of visits since the last update. Both conditions need to be satisfied before the update is performed. That is, the time since the last update must be longer than given period and the increased number of visits must be higher by a certain percentage before the update is performed. The update frequency is adjustable (see below). An exception to this rule is the moment just before the map archive is created, when each map is updated to provide a snapshot for the whole archive period. Maps are generated for several geographical regions and subsequently linked together to provide zooming capability.

Visits to the web page being monitored are clustered when displayed in maps to avoid complete obscuring by overlapping of dots and to provide better understanding and visualization of the number of visits occurring in each geographical region. The clustering algorithm groups visits co-occurring within a given distance in pixels. Therefore, the geographical detail increases as the user zooms in. In this embodiment, each map is generated at two levels of clustering to allow users both to see summarized statistics and to look for individual visits.

Visit data and maps that are generated are periodically copied from the current database 18 to respective archives 24, 26 so that a user can see a history of visits to their site. Both visits and maps are archived to avoid overcrowding of maps and save process time during map generation. This means that there is still a total sum in new maps. Archiving frequency is stored and is adjustable by a system administrator, or automatically when certain thresholds are surpassed, or alternatively by the end-user.

Figure 7:
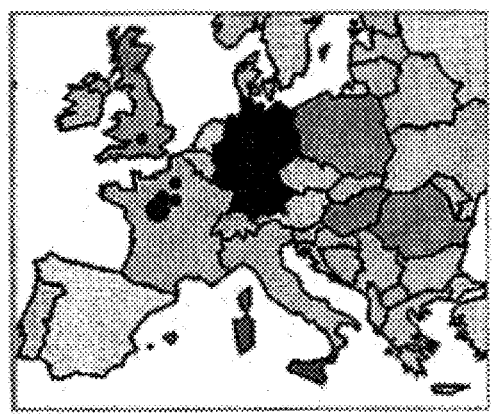
FIG. 7 shows a map with country shading representing large archive totals overlaid with red dots representing more recent visit counts, produced by an embodiment of the invention.

Both visits and maps are archived at a regular interval ('the archive frequency'). Every time a map and visits are archived, the visual counter (map) starts again from zero (the overall all-time total is preserved in the maps in textual form). However this 'start from zero' map, rather than just being blank, can at the user's discretion be color-coded so that the resultant coloring/shading is representative of the previous totals. For example, France can be shown in 'Color 1' which represents '1,000-9,999 visits' whereas Germany can be shown in 'Color 2' which represents '10,000-99,999 visits', the actual numbers being determined appropriately according to the overall totals, as illustrated in FIG. 7. This shading approach is known in the disciplines of cartography and Geographical Information Systems as a "choropleth map"—our innovations in this respect are to use such maps as background archive maps and to overlay them with our dot clusters. Old maps are accessible to users although the set can be reduced. The archive frequency is adjustable (see below for details).

Archiving achieves two important elements of scalability: the maps do not get overcrowded and, as the actual computer processing time grows dramatically with the number of visits counted, processing time is saved.

As mentioned above, updates and archives are made at predetermined frequencies. These can be set for each user. There are two frequencies set for each user. First, there is the update frequency, which specifies how often the map for the user will be updated (if the number of visits has changed significantly). Therefore, a user's update frequency determines the minimum time between two map updates for the user. Second, there is the archive frequency, which specifies how often "current" visits and the map displaying them will be archived; that is, how often the counting will start from zero, specifying the time window for accumulation of visits displayed in the map. Both frequencies can be changed by the user (if their combination doesn't exceed a limit, as will be discussed below) and are also changed automatically in case a limit is exceeded.

The system in one embodiment imposes limits on some activities of its users to ensure that a user does not impose an excessive load upon the system. There are two measures limited in this embodiment: the number of visits per day (which limits the everyday load on the server by visits) and the number of visits displayed in the current map (which limits the CPU processing time while generating maps). In a typical embodiment, the threshold for the number of visits per day is set once for each category of user, so cannot be changed by individual users. Since the number of visits displayed in the current map affects map generation time, its threshold differs according to a combination of update/archive frequencies (and also with user category). This motivates users to either archive more frequently so as to bring the number of displayed visits down, or update their maps less frequently and thereby save CPU processing time on the server.

Every day a limit checker is run that warns users who are exceeding (or coming close to exceeding) the allowed number of visits per day. It also adjusts the update and archive frequencies for users who have exceeded their limit of displayed visits and notifies the user accordingly.

The number of visits displayed in a map affects the processing time for a map update. In contrast to the daily visits limit, as the number of displayed visits affects map generation time, its threshold differs as a function of the combination of update/archive frequencies (and also with the user 'category', e.g. free or paying user). This motivates users either to archive more frequently and bring number of displayed visits down or to update the map less frequently. In both cases processing time is saved.

Adherence to both types of limit is checked every day by a process that is run automatically. The process sends an e-mail message that contains a notification or a warning to any user that is exceeding the allowed number of visits per day. The message may suggest that it may be appropriate for the user to switch to a different user category with higher limits. For users breaking the limits for the number of displayed visits, the process adjusts their update or archive frequency to conform to the rules and sends an e-mail notification message to inform the user that the frequency was changed and the user can adjust them to better suit his/her needs.

Figure 6:
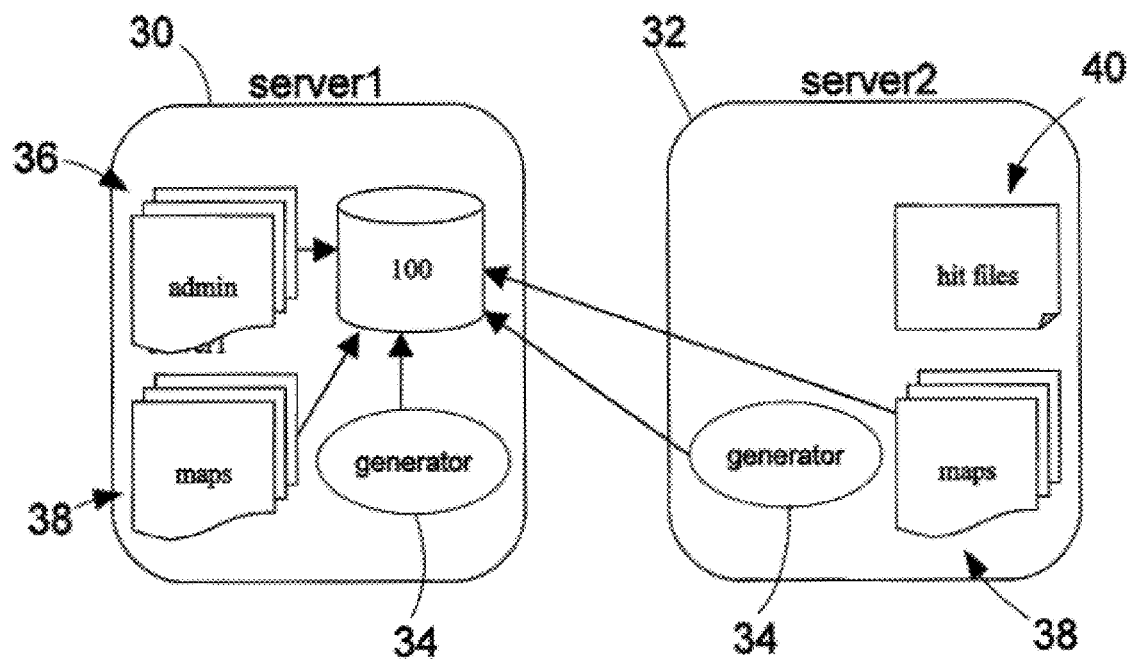
FIG. 6 is a schematic diagram of a system embodying an embodiment of the invention.

As shown in FIG. 6, in this embodiment, the system server is implemented on two separate server subsystems 30,32 referred to a server1 and server2. Each server subsystem includes a generator 34. There is only one common database 100 for all servers, which is stored on server 130. This allows all URLs to be stored on one place—in the table tblUrls. For administration of the system, it is advantageous that access to the database for users on all servers is as unified as possible.

The main web site and administration pages 36 are on server1 only. Generated map pages 38 that include map images are on all servers.

On server1, all visits are added on-the-fly into the database 100, on server2 visits are processed from web server logs and stored into hit files 50 (one file per user). Archiving on server1 is done by copying visits into an archive table (tblTotals). On server2, archiving involves simply renaming the hit file 40 and creating a new one for current visits. For server1, archive times are read from a special table (tblUpdates) while on server2 the dates are contained in an archive.

---
Algorithm 1: Visit counting
---

Variables:
IPA = IP address (e.g. 212.58.228.155 is the IP address of bbc.co.uk)
TALLY = number of identical IPA occurrences
UID = User ID, typically the user's URL
D = log-file database
MDB = master database ---
Algorithm 1a (Serving Maps):
---

For each new day,
For each request of the form <img src = index2.php?url=UID> do
    a) store, in log-file D, a 'tuple' containing [IPA, UID] where IPA is the IP address of the requester, and UID is the User ID of the registered ClustrMaps user (typically it is precisely the URL of their home page).
    b) retrieve from map-storage-database [d2] the correct thumbnail map, a 10KB .jpg image which we shall call image[T, UID], the current thumbnail map for user UID
    c) return the response message to the requester A, containing image[T, UID] until
  no more requests
until end-of-day.

---
Algorithm 1b (Incrementing the counters):
---

Once per day
    For each tuple containing [IPA, UID] in log-file D
        IF Master Database MDB contains tuple ([IPA, UID, TALLY])
        THEN
            TALLY := TALLY + 1
        ELSE
            create new tuple [IPA, UID, 1] in master Database MDB ---
Algorithm 2. 'Check limits'
---

Using a sums table, keep track of daily increases in number of visits for each UID (by remembering totals). The table is updated every day, as follows:
Variables:
    IPA = IP address
    TALLY = number of identical IPA occurrences
    UID = User ID, typically the user's URL
    D = log-file database
    LAT = latitude
    LON = longitude
    MDB = master database
    CURRENT_SUM = total number of visits
    PREV_SUM = as above, but from prior run
    NEW_CURRENT_SUM = today's fresh total
Once per day
    FOR EACH UID:
        count NEW_CURRENT_SUM as sum of TALLY over all tuples in master database MDB for given UID
        NEW_SUM := NEW_CURRENT_SUM + archived sum
        update tuple in sums table:
        IF exists tuple ([UID, SUM, PREV_SUM]) THEN
            PREV_SUM := SUM; SUM := NEW_SUM
        ELSE
            create new tuple [UID, NEW_SUM, 0]
    the check_limit is then run daily following this algorithm:
    for each tuple in sums table:
        IF SUM − PREV_SUM > daily limit THEN
            warn/notify user
        count CURRENT_SUM as sum of TALLY over all tuples in master database MDB for given UID
        IF CURRENT_SUM > displayed limit THEN
            lower update frequency

Algorithm 3: Rendering the maps

Variables:
IPA = IP address
TALLY = number of identical IPA occurrences
UID = User ID, typically the user's URL
D = log-file database
LAT = latitude
LON = longitude
MDB = master database
MAPPROJ = map projection (e.g. Mercator, etc. but expressed as a formula/mapping)
X,Y = the actual X and Y pixel coordinates on a specific image
ARCHF = archive frequency (daily, weekly, monthly, or yearly)
UPDF = update frequency (daily, weekly, monthly, or yearly)
CURRENTDOTS = number of visits on map represented by some proportionally-related number of actual dots
NEWDOTS = number of new visits represented by some proportionally-related number of actual dots
THRESHOLD = how much bigger the NEWDOTS needs to be for new map (e.g. 1.2 means 20% growth required). The threshold can optionally be dependent on number CURRENTDOTS to allow more frequent updates for small users; i.e. THRESHOLD = f(CURRENTDOTS)
FOR EACH UID in MDB,
 IF elapsed time since last update > UPDF (e.g. 1 week has elapsed and the update frequency is weekly)
    THEN
    IF (NEWDOTS + CURRENTDOTS) > THRESHOLD*CURRENTDOTS (i.e. there are enough new visitors to warrant the display)
       THEN
1. FOR EACH [IPA, TALLY] IN UID record
        convert(IPA)=>[LAT, LON], using a commercial database lookup table from
        MaxMind Ltd. (for example convert(bbc.co.uk) => [51.5000, −0.1167], a map
        location in central London)
        convert(LAT, LON, MAPPROJ)=>offset[X,Y]
        work out the actual X,Y

Algorithm 4: Dot clustering

For a set of N items to be clustered, the embodiment assumes an N × N 'similarity matrix', for which the basic process of agglomerative hierarchical clustering (well known in the literature) is as follows:
    1. Assign each item to a cluster. Thus, for N items, there are N clusters, each with one item. Let the similarities between the clusters be the same as the similarities between the items they contain.
    2. Where possible, pre-group all clusters that are similar in some way - e.g. for map locations this may be done by rounding off the latitude/longitude co-ordinates (see algorithm 5) or pre-grouping those having the same post-code.
    3. Find the most similar pair of clusters and merge them into a single new cluster. There are now N−1 clusters.
    4. Compute the similarities between the new cluster and each of the old clusters.
    5. Repeat steps 3 and 4 until all items are clustered into a single cluster of size N, or until a threshold of maximum satisfying similarity is reached (i.e. the clusters are 'good enough').

Algorithm 5: Pre-grouping of items

VARIABLES
    NEWDOTS = number of new visits represented by some proportionally-related number of actual dots
    TALLY = number of identical IPA occurrences
    LAT = latitude
    LON = longitude
    GROUPING_THRESHOLD = threshold for NEWDOTS after which the pre-grouping is done before map generation = clustering
    GROUPING_DECIMAL_PLACES = number of decimal places; i.e. precision or level on which the hits will be grouped
Intuitively, we can say that all dots within +/−GROUPING_DECIMAL_PLACES of the mesh are grouped together and put at location of their "centre of gravity". For example when using 1 decimal place of accuracy, two hits lying at 1.23 and 1.19 respectively (and which are therefore effectively the same when considered at a precision of only 1 decimal place of

| Algorithm 5: Pre-grouping of items |
|---|
| accuracy, i.e. 1.2) will result in a group of two lying at 1.21.<br>IF (NEWDOTS > GROUPING_THRESHOLD) THEN<br>    FOR EACH [LON, LAT, TALLY] record<br>        [ROUND_LON, ROUND_LAT] = round([LON, LAT], GROUPING_DECIMAL_PLACES)<br>        rounds coordinates with given precision<br>        addTally([ROUND_LON, ROUND_LAT], TALLY)<br>        increases tally of group for [ROUND_LON, ROUND_LAT]<br>        recountCentre([ROUND_LON, ROUND_LAT], GROUP_TALLY, [LON, LAT], TALLY)<br>        re-counts real coordinates of the whole group to lie in centre of gravity of all grouped items<br>After pre-grouping, the groups are passed into clustering algorithm and used as normal items there. |

| Algorithm 6: Normalization of total number of dots when over threshold |
|---|
| NORMALIZATION_LEVEL = the threshold above which we apply the normalization.<br>Thus, if NEWDOTS is higher than this level it will be normalized to NORMALIZATION_LEVEL i.e. it will end up being NORMALIZATION_LEVEL <= NORMALIZED_DOTS < 10* NORMALIZATION_LEVEL<br>Intuitively, we could say that anytime the NEWDOTS is higher than 10* NORMALIZATION LEVEL a common DIVIDER (a power of 10) is determined so that NORMALIZATION_LEVEL <= NEW DOTS / DIVIDER < 10* NORMALIZATION LEVEL; i.e. we want to bring the NEW_DOTS to the same number of digits as NORMALIZATION_LEVEL.<br>IF (NEWDOTS > NORMALIZATION_LEVEL) THEN<br>    DIVIDER = 10^(floor(log10(hit_sum/NORMALIZE_DOT_NUM_TO)))<br>    a number to divide the NEWDOTS to get it between NORMALIZATION_LEVEL and 10*NORMALIZATION_LEVEL<br>        FOR EACH (LON, LAT, TALLY])<br>            setTally(round(TALLY/DIVIDER))<br>    IF (NEW_TALLY = 0) NEW_TALLY = 1<br>REAL_DIVIDER = sum(TALLY) / sum(NEW_TALLY)<br>counts the real divider which can be used e.g. for rough descriptions over continent maps. This is different from DIVIDER due to rounding and mainly due to leaving at least one visit for each record. |

While Algorithm 5 reduces the number of hits by grouping them, Algorithm 6 just "normalizes the tally" for each group separately.

For example, having hits from 5 ip addresses ([ion, lat, tally]:

[9.1, 20, 700000]

[8.7, 20, 200000]

[5, 25, 500000]

[15, 15, 13]

[20, 35, 4]

Then Algorithm 5 results in grouping just the first two ips:

[8.9, 20, 900000]

[5, 25, 500000]

[15, 15, 13]

[20, 35, 4]

Then Algorithm 6 normalizes the tallies. Because the total for the example above is 1,400,017, the number needs to be divided by 10 to get the number of digits of NORMALIZATION_LEVEL (hundred-thousands), resulting in the following (remember, the third digit in each tuple shows the tally, this time having been divided by 10):

[8.9, 20, 90000]

[5, 25, 50000]

[15, 15, 1] (note that 13/10=1.3 has been rounded down to 1)

[20, 35, 1] (note that 4/10=0.4 would have been rounded down to 0, but in this case we increment it to 1 to ensure at least 1 visit gets depicted in that location)

Now the new 'normalized' sum is 140,002.

Ideally, we want the total to be between NORMALIZATION_ LEVEL and 10*NORMALIZATION_LEVEL. In other words we're trying to bring the sum to the number of digits of NORMALIZATION_LEVEL. NORMALIZATION_ LEVEL is the only parameter for Algorithm 6, which both (a) provides the threshold over which we do the normalization and (b) provides the level to which the "normalization of total sum" is done.

Due to rounding error, we usually end up with a new sum that is slightly higher than 10*NORMALIZATION_LEVEL, but the difference is typically not significant and decreases through the use of pre-grouping, which creates bigger groups. Since the new sum is not exactly what we wanted, we compute the REAL_DIVIDER, which is the real ratio between the original sum and real normalized sum, and which can be used e.g. for rough descriptions over continent maps. This is different from DIVIDER (which is a 10^N number common for all IP addresses, and is used to "normalize" the tallies) due to rounding and mainly due to our desire to leave at least one visit for each record.

What is claimed is:

1. A method for monitoring visits by visitors to a web site, comprising the following computer-implemented steps:
   a. embedding in a web page to be monitored code to request a thumbnail map from a system server when the page is visited and loaded into a browser, said thumbnail map providing both a user-activateable link to a page within the system server and an element of a mechanism for counting visits by the visitors who are currently visiting the site;
   b. at the system server, returning the requested thumbnail map to the web browser, and recording the IP address from which the thumbnail map was requested;
   c. for each recorded IP address, determining a corresponding geographical location from which the web page was visited;
   d. grouping the visits into clusters according to their geographical locations, the visits being grouped by a clustering process that includes both agglomerative hierarchical clustering and also pre-grouping of visits from similar locations, wherein the agglomerative hierarchical clustering is speeded up by the pre-grouping of visits from locations that are deemed similar by rounding off their coordinates and also by similarity of postal codes, and normalizing each cluster via reduction by a common factor; and
   e. periodically creating and storing a detailed map and a thumbnail map, each map being an image that is a representation of the geographical distribution of the clusters of recorded IP addresses, each cluster being represented on the map by a mark that indicates the location of the cluster and varies in dependence on the total number of visits in that cluster, wherein the detailed map has a larger scale and contains more detail than the thumbnail map,
   wherein, upon activation of the user-activateable link provided by the thumbnail map, the linked page within the system server that includes the detailed map is retrieved and displayed by the browser.

2. The method according to claim 1 in which the size of each mark is an indication of the number of visits in the cluster.

3. The method according to claim 1 in which the number of the marks is reduced and the size of the marks is assigned by a process of normalisation when the number of visits exceeds a predetermined threshold.

4. The method according to claim 1 in which the marks are appropriately circular.

5. The method according to claim 1 in which the pre-grouping is performed for map locations by rounding off their co-ordinates.

6. The method according to claim 1 in which the pre-grouping is performed for those visits having a common post-code.

7. The method according to claim 1 in which the number of visits in each cluster is reduced by a common factor.

8. The method according to claim 1 in which, at step d, one or more additional maps are created, each being a different representations of the geographical distribution of the recorded IP addresses at a different scale.

9. The method according to claim 1 in which data representing visits is recorded in a current database.

10. The method according to claim 9 in which each visit is recorded as it occurs.

11. The method according to claim 9 in which data representing visits is derived from data recorded in the logs of the system server.

12. The method according to claim 9 in which the created maps represent information in the current database.

13. The method according to claim 9 in which information in the current database is periodically copied to an archive.

14. The method according to claim 13 in which information is removed from the current database following its being copied to the archive.

15. The method according to claim 1 in which, prior to creating the maps, an image generated in a previous invocation of the map creation step is copied to an archive.

16. The method according to claim 1 in which the thumbnail map is generated in response to one or more triggers.

17. The method according to claim 16 in which the triggers include one or more of elapse of a predetermined time; a change threshold in the number of recorded visits is exceeded, and immediately before a map is archived.

18. The method according to claim 1 in which the number of IP addresses represented in the maps is restricted to a predetermined limit.

19. The method according to claim 1 in which the number of IP addresses recorded for the monitored web site is restricted to a predetermined limit.

20. A web system comprising a server computer that is constructed and arranged for co-operation with a web browser to monitor visits by visitors to a web site, the system comprising:
   a. a web page having embedded within it code to request a thumbnail map from a system server when the page is visited and loaded into a browser, said thumbnail map providing both a user-activateable link to a page within the system server and an element of a mechanism for counting visits by the visitors who are currently visiting the site;
   b. a system server that is constructed and arranged to return the requested thumbnail map to the web browser, and to record the IP address from which the thumbnail map was requested;
   c. means for determining for each recorded IP address a corresponding geographical location from which the web page was visited;
   d. means for grouping the visits into clusters according to their geographical locations, by a clustering process that includes both agglomerative hierarchical clustering and also pre-grouping of visits from similar locations, wherein the agglomerative hierarchical clustering is speeded up by the pre-grouping of visits from locations that are deemed similar by rounding off their coordinates and also by similarity of postal codes, and normalizing each cluster via reduction by a common factor; and
   e. means for periodically creating and storing a detailed map and a thumbnail map, each map being an image that is a representation of the geographical distribution of the clusters of recorded IP addresses, each cluster being represented on the map by a mark that indicates the location of the cluster and varies in dependence on the total number of visits in that cluster, wherein the detailed map has a larger scale and contains more detail than the thumbnail map,
   wherein the system is constructed and arranged such that, upon activation of the user-activateable link provided by the thumbnail map, the linked page within the system server that includes the detailed map is retrieved and displayed by the browser.

21. A system server comprising a server computer that is constructed and arranged for co-operation with a web browser to monitor visits by visitors to a web page having embedded within it code to request a thumbnail map from the system server when the page is visited and loaded into a browser, said thumbnail map providing both a user-activateable link to a page within the system server and an element of a mechanism for counting visits by the visitors who are currently visiting the site, wherein the system server is constructed and arranged to return the requested thumbnail map to the web browser, and to record the IP address from which the thumbnail was requested, the system server comprising:

a. means for determining for each recorded IP address a corresponding geographical location from which the web page was visited;

b. means for grouping the visits into clusters according to their geographical locations, by a clustering process that includes both agglomerative hierarchical clustering and also pre-grouping of visits from similar locations, wherein the agglomerative hierarchical clustering is speeded up by the pre-grouping of visits from locations that are deemed similar by rounding off their coordinates and also by similarity of postal codes, and normalizing each cluster via reduction by a common factor;

c. means for periodically creating and storing a detailed map and a thumbnail map, each map being an image that is a representation of the geographical distribution of the clusters of recorded IP addresses, each cluster being represented on the map by a mark that indicates the location of the cluster and varies in dependence on the total number of visits in that cluster, wherein the detailed map has a larger scale and contains more detail than the thumbnail map, wherein the system server is constructed and arranged such that, upon activation of the user-activateable link provided by the thumbnail map, the linked page within the system server that includes the detailed map is retrieved and displayed by the browser.

22. The method according to claim 1 in which the location of each mark is an indication of the weighted geographic center of the visits in that cluster, calculated by taking into account the number and location of each of those visits.

* * * * *